United States Patent
Elsbett et al.

[11] 3,890,949
[45] June 24, 1975

[54] TWIST TURBULENCE FORMING PASSAGE, ESPECIALLY IN THE INTAKE SYSTEM OF RECIPROCABLE INTERNAL COMBUSTION ENGINES

[76] Inventors: Ludwig Elsbett; Gunter Elsbett, both of D 8543 Hilpoltstein, Germany

[22] Filed: July 16, 1973

[21] Appl. No.: 379,557

[30] Foreign Application Priority Data
July 17, 1972 Germany............................ 2235050

[52] U.S. Cl. ........................... 123/188 M; 123/30 C
[51] Int. Cl. ............................................. F02f 1/42
[58] Field of Search ...... 123/188 M, 191 M, 193 H, 123/193 CH, 41.82, 30 C

[56] References Cited
UNITED STATES PATENTS
3,274,981  9/1966  Peras ................................ 123/30.2

FOREIGN PATENTS OR APPLICATIONS
1,207,904  10/1970  United Kingdom ............ 123/188 M
914,745  1/1963  United Kingdom................ 123/30.2
1,956,350  5/1971  Germany......................... 123/188 M
2,012,436  3/1969  Germany......................... 123/188 M

*Primary Examiner*—Charles J. Myhre
*Assistant Examiner*—W. Rutledge, Jr.
*Attorney, Agent, or Firm*—Walter Becker

[57] ABSTRACT

A passage for supplying a gaseous fuel component, such as air, to the cylinder of an internal combustion engine in which the gaseous component is caused to take on a rotating movement prior to entry thereof into the cylinder. The passage has a curved section at the upstream end and at the downstream end has a cylindrical section which is provided with a valve. Between the curved upstream section and the cylindrical downstream section there is a helical section. The gaseous component is caused to rotate about the axis of the helical section and, therefore, to enter the cylinder in a turbulent, rotating, condition. Inlet and outlet passages are the same and at least similar with respect to the foregoing passage characteristics.

11 Claims, 2 Drawing Figures

TWIST TURBULENCE FORMING PASSAGE, ESPECIALLY IN THE INTAKE SYSTEM OF RECIPROCABLE INTERNAL COMBUSTION ENGINES

The present invention relates to a twist or turbulence forming passage, especially in the intake system of reciprocable piston internal combustion engines. This turbulence forming passage is, for creating a turning movement in a gaseous medium, passed through and curved in the direction of the desired twist or turbulence, and comprises at least one shut-off valve in the form of a valve located in a cylinder head. The said passage has a helical section and an adjacent curved section while said helical section is located between said curved section and the cylinder chamber. The said passage has a helical section and an adjacent curved section. The helical section is located between said curved section and the cylinder chamber and has at least one end point of the curved section located on or within the region of a cross-sectional passage plane. This plane extends parallel to another cross-sectional plane of the passage taken further therealong and the last mentioned plane intersects the cylinder axis at a right angle. The axis of the helix of the helical section is arranged on or within the region of the cross-sectional plane of the passage, which plane passes through the cylinder axis, but is eccentric with regard to the valve axis.

In order to increase the output, especially of a reciprocable internal combustion engine such as a Diesel engine, it is necessary on one hand to introduce into the cylinder a sufficient quantity of fresh air, and on the other hand to impart upon said fresh air such twist or turbulence that while maintaining the desired twist formation, the combustion of the fresh air with the present fuel can be effected in the combustion chamber. Experience and tests have shown that intermixture of the fresh air with the fuel is all the better, the better the twist or turbulence of the fresh air in the cylinder or combustion chamber is adapted to the mixing operation, because for an optimum combustion the finding applies that to the fresh air only that much fuel should be bound as is necessary for an approximate residue free combustion. In other words, it should be avoided that fuel is bound to already burned fresh air or that the fresh air has not sufficient fuel available. In both instances a lower output results, and in many cases there will occur a combustion with a considerable amount of soot, which combustion will cause annoyance, particularly when operating in a city.

With a reciprocable piston internal combustion engine it has become known to equip the inlet and outlet passage of such an engine with twist or turbulence forming elements in order to impart a twist or turbulence upon the air enclosed in the combustion chamber and leaving the same again. In this connection, the two passages which leave the cylinder head at the same or opposite side should be helically curved. The inlet and outlet passages which have a curved section and a helical section each between said curved section and the cylinder, have a helix axis which is offset relative to a respective valve axis. The axis of the helix as well as the valve axis are located on a cross-sectional passage plane which passes through the cylinder center. With these passages, it is, however, considered disadvantageous that the cross section of the respective passage within the region of the cylinder has a ball-shaped extension as a consequence of which, beyond doubt, the desired twist or turbulence formation beyond doubt is disadvantageously affected.

It is here where the present invention starts and where the problem underlying the present invention is located. More specifically, it is an object of the present invention to provide a twist or turbulence forming passage through which in a minimum of time large air voluminae can be passed without material flow losses, and by means of which furthermore it will be possible to impose a twist or turbulence upon the fresh air, which twist or turbulence will, at a high delivery, make possible an optimum intermixing and combustion of the respectively present fuel in a very short time.

These and other objects and advantages of the invention will appear more clearly from the following specification, in connection with the accompanying drawing, in which.

Figure 1:
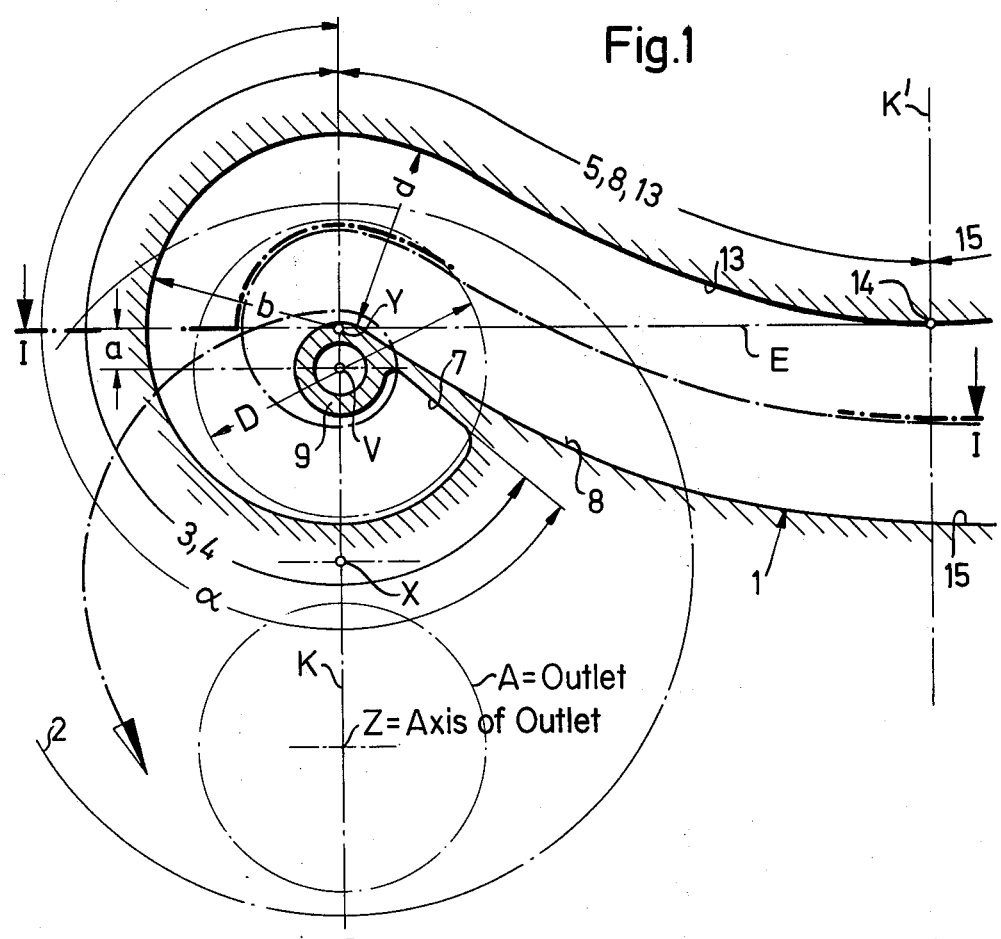
FIG. 1 is a top view of a cylinder head cut through in transverse direction thereof, with a twist or turbulence forming passage which is formed into the cylinder head and is located in the intake.
Figure 2:
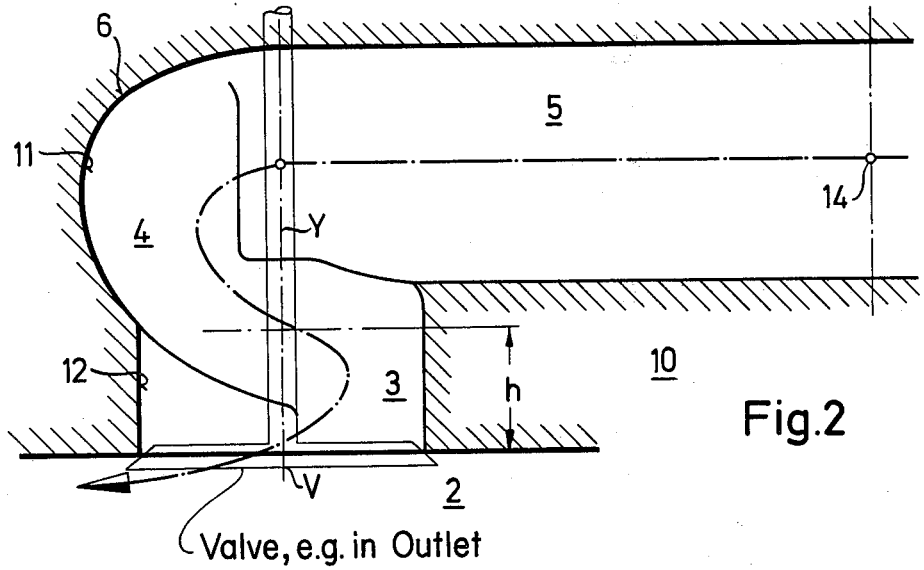
FIG. 2 represents a section taken along the line II—II of FIG. 1.

The problem underlying the present invention has been solved by designing the curved section in S-shaped form and having the end points of said curved section located on one hand on or within the region of the first cross sectional passage plane, and on the other hand are located in or on the region of the second cross-sectional passage plane. The arrangement according to the invention is furthermore characterized in that the helical section has an approximately constant inclination or pitch and a helical angle of at least 220° as well as an approximately constant distance between the axis of the helix and that lateral passage wall which is located opposite the axis of the helix. The arrangement according to the invention is furthermore characterized in that that end of the helical section which faces toward the cylinder chamber leads into a cylindrical valve opening passage which opens toward the cylinder chamber.

The above outlined features not only bring about an advantageous solution of the problem underlying the present invention, but in addition thereto a passage is created in view of which, in spite of a flow-favorable arrangement of the twist or turbulence forming elements large cross setions of the passage will be possible. The last mentioned feature has the advantage that even with a short length, particularly in the intake passage, a sufficiently large air column can be introduced into the cylinder and combustion chamber. Since, as is well known, also the output of an internal combustion engine depends on one hand on the degree of order of the air guidance in the cylinder and the combustion chamber and on the other hand on the delivery created, in other words, is dependent on the air quantity made available for the combustion, it will be appreciated that by the employment of the features according to the invention, a considerable increase in the output will be obtained with a minimum of technical devices and expenses therefor. Due to the fact that the passage cross section remains in all its sections approximately constant so that it does not encounter any constrictions, especially in the valve opening passage, it is furthermore possible to design the passage even within the region of the valve of the same magnitude as the valve diameter.

A further advantageous development of the invention is characterized in that the walls of the valve opening passage extend coaxially with regard to the axis of the valve and extend at a right angle to a straight line (drop line) of the S-shaped section, which straight line or drop line intersects the cross-sectional passage plane through the axis of the helix.

These features will assure that in particular the fresh air drawn in through the intake line will in view of considerable deviation, very effectively be deviated into the desired twist or tolerance because the deviation of the flow subjects all fresh air particles to the necessary twist or turbulence.

According to a further development of the invention, one side of the wall of the S-shaped section extends up to the axis of the helix and here is designed as a flow favoring blade.

This design of the passage has the advantage that the air will with great energy radially be pressed against the guiding wall of the passage in the helical section whereby a twist or turbulence will be imparted upon the air.

A further feature of the invention consists in that a straight line which intersects the cross-sectional passage plane through the axis of the helix is tangent to an inner wall of the S-shaped section of the passage at the level of the second cross-sectional passage plane which extends parallel to the first cross-sectional passage plane.

In view of this offsetting of the axis of the helix and the thus made possible displacement of the flow passage in the S-shaped section, the air can in a very favorable manner flow onto the passage already outside the helical section whereby the air will already from this point on be subjected to the desired twist or turbulence. This flow favorable feature has the advantage that the turning movement of the air is generated solely by the intake stroke of the piston and that consequently it is necessary only in rare instances to provide a pressure generating blower.

Referring now to the drawings in detail, the twist or turbulence forming passage 1 is formed primarily by three sections of which starting from a cylinder 2 of an internal combustion engine, the first section forms a valve opening passage 3 whereas the second section is designed as a helical passage section 4, and the third section is designed as an S-shaped curved guiding passage 5. The helical passage section 4 which is located between the two other passage sections 3 and 5 has a helical ascent or pitch 6 which is wound around a helical axis Y located outside the cylinder axis X. The helical axis Y which is located on a cross-sectional passage plane K extending through the cylinder axis X is also offset relative to the valve axis V which is associated with the passage 1 by a distance a. With this design, also the valve axis is located in the same cross-sectional passage plane K. The pitch 6, i.e. the helical passage section 4 has a helical angle α of preferably at least 220°, in the specific instance shown a helical angle of 240°. This angle deviation is with the design of the passage 1 as intake passage, this passage is confined by a wall 7 forming the end of the helical passage section 4. This wall 7 which forms a blade-shaped extension of a wall 8 having the shape of a guide vane located in the guiding passage 5 is extended by approximately half the valve diameter from the end of the guide vane shaped wall 8 to the helical axis Y and here is curved toward the valve opening passage 3 in such a way that the air passing by the same is deviated not only radially, but is also guided in a flow favorable manner to form a twist or turbulence. The valve passage 3 which is adjacent said helical passage section 4 leads into the chamber of cylinder 2 so that the air while maintaining its twist or turbulence passes through these passage sections 4, 3. The height of the valve opening passage 3 is to be adapted to the pitch 6 of the helical passage section 4 in order not to disturb the twist or turbulence of the air. The valve guide 9 which is provided within the region of the helical axis Y and is in the shape of a bore through the cylinder head 10 rests laterally on the end of the blade-shaped extension of wall 7 so that its mantle forms the inner wall of the helical passage section 4. The outer walls 11 of the helical passage section 4 have between themselves and the helical axis Y respectively, the same or approximately the same distance b so that also the passage cross section in this passage section 4 will be the same or approximately the same. Also, the walls 12 of the valve opening section 3 have, due to the cylindrical design of this passage, equal distances from the valve axis V. The S-shaped section, i.e. the guiding passsage 5 which is adjacent to the helical passage section 4 likewise has equal cross sections as the above mentioned helical passage section 4 and differs thereover primarily only in that it extends preferably without ascent or pitch between the two cross-sectional plates K, K' of the passage. The S-shaped curvature of this guiding passage 5 is so selected that a straight line E which intersects the cross-sectional passage plane K through the helical axis Y in the axis itself of the helix, extends tangentially to that wall side 13, which faces away from the guide vane-shaped wall 7 within the region of the second cros-section passage plane K' which is parallel to the first cross-sectional passage plane K. This straight line E which is the so-called drop line determines by itself contacting or tangent point 14 the position of a so-called deviating or end point of the respective guiding passage 5 from which point the guiding passage, depending on the direction of flow of the air merges with the helical or the straight passage sections 4, 15 respectively.

As has been proved by numerous tests with the passage 1 according to the invention, it is expedient to select the length of the S-shaped guiding passage 5 which is located between the cross-sectional passage planes K, K' approximately from two to three times the length of the intermediate passage diameter d. As to the distance a or the offset of the helical axis Y relative to the valve axis V, it has been found that a distance of approximately one-half to one-fourth of the diameter D of the valve opening passage 3 will be sufficient. Also the height h of the valve opening passage 3 may amount to only approximately from 0.3 to 0.5 of the diameter D of the valve opening passage or valve opening. It has been found particularly favorable to make the advancing lead or pitch 6 in the helical passage section 4 approximately twice the mean passage diameter per revolution. These values represent approximations ascertained by tests and do, of course, not exclude other values for the passage.

With the passage 1 illustrated in FIG. 1, the valve openings for the inlet and outlet are located in the same cross-sectional passage plane K through the cylinder axis X. For the sake of simplicity, only the passage 1 for the inlet has been shown. It is, however, also possible to provide the outlet passage with the same or a similar passage 1. When also the outlet is provided with a passage 1 according to the invention, the desired twist or turbulence formation may be obtained somewhat easier because in the entire intake and outlet system there are not provided any inserts which would interfere with the twist or turbulence formation by means of which the air passing through the cylinder 2 could be changed in the passage sections. The cylinder 2 of the internal combustion engine, which latter is shown only in part, may on a piston moved therein comprise a combustion chamber in the form of a ball-shaped combustion chamber or in the form of a lens-shaped or lamp-shaped combustion chamber, or combustion chamber of a different shape. When designing the combustion chamber in the form of a ball in the piston head, the cross section of the passage and thus also the twist or turbulence elements may be so designed that the air which shoots into the combustion chamber is from the very start adapted to the shape of a combustion chamber in the piston. In this way it will be possible to impart, in particular upon the intake air such turning movement that definitely an optimum combustion will be assured with a sufficient delivery. When designing such air turbulence which winds around an axis, and thereby a corresponding twist or turbulence, it will be safely avoided that fuel will be bound onto already combusted air or too much fuel will pass to too little fresh air. This step will assure in particular a proper inlet of the air into the combustion chamber and thereby a proper combustion while expediently the air which is introduced for the combustion will, during its passage through the combustion chamber, be passed only once by the fuel jet.

It is, of course, to be understood that the present invention is, by no means, limited to the specific showing in the drawing, but also comprises any modifications within the scope of the appended claims.

What is claimed is:

1. In combination with an internal combustion engine having a cylinder, a cylindrical gas inlet passage having an opening at one end located axially into one end of the cylinder and adapted for being closed at the cylinder end, a helical channel having one end in communication with the passage, a valve having an actuating stem coaxial with the cylindrical gas inlet passage, said cylinder having cylinder means for slidably receiving the valve stem and disposed near the other end of the cylindrical gas inlet passage and rising from said other end of said cylindrical gas inlet passage to the other end of said helical channel, and a supply channel for supplying gas to said helical channel and having one end connected to said other end of said helical channel and the other end adapted to recieve the gas to be supplied to said cylinder via said channels and passage, the axis of said helical channel being laterally offset from the axis of said cylindrical gas inlet passage and the peripheral wall of said helical passage being a substantially uniform distance from the axis of said helical channel.

2. An engine in combination according to claim 1 in which said supply channel is curved to substantially an S-shape.

3. An engine in combination according to claim 1 in which said one end of said cylinder also has an outlet passage spaced laterally from said cylindrical gas inlet passage and said other end of said helical channel is disposed substantially in a plane passing through the central axes of said cylindrical gas inlet passage and said outlet passage.

4. An engine in combination according to claim 1 in which said one end of said cylinder also has an outlet passage spaced laterally from said cylindrical gas inlet passage and said other end of said helical channel is disposed substantially in a first plane passing through the central axes of said cylindrical gas inlet passage and said outlet passage, said supply passage being S-shaped and having the said one end disposed in said first plane and the other end disposed in a second plane parallel to said first plane and spaced therefrom.

5. An engine in combination according to claim 1 in which the pitch of said helical channel is substantially uniform.

6. An engine in combination according to claim 1 in which said helical channel extends over an angle of at least 220°.

7. An engine in combination according to claim 1 in which said supply channel is in a plane which is perpendicular to the axis of said cylindrical gas inlet passage.

8. An engine in combination according to claim 1 which includes a rib formed as a wall portion of the supply end connecting with the valve guide means to form a gas guide blade.

9. An engine in combination according to claim 1 in which said one end of said cylinder also has an outlet passage spaced laterally from said cylindrical gas inlet passage and said other end of said helical channel is disposed substantially in a first plane passing through the central axes of said cylindrical gas inlet passage and said outlet passage, said supply passage being S-shaped and having the said one end disposed in said first plane and the other end disposed in a second plane parallel to said first plane and spaced therefrom, one side of said supply passage in said first plane intersecting a point on the axis of said helical channel, a line from said point perpendicular to said first plane intersectiing said second plane at the other side of said supply passage.

10. An engine in combination according to claim 1 in which the axial length of said cylindrical gas inlet passage is from about 0.3 to 0.5 times the diameter thereof.

11. An engine in combination according to claim 1 in which the advancing pitch of said helical channel per revolution is equal to about twice the mean diameter of the helical channel.

* * * * *